Nov. 11, 1947. S. M. ELLIOTT 2,430,560
TIRE
Filed Dec. 30, 1942
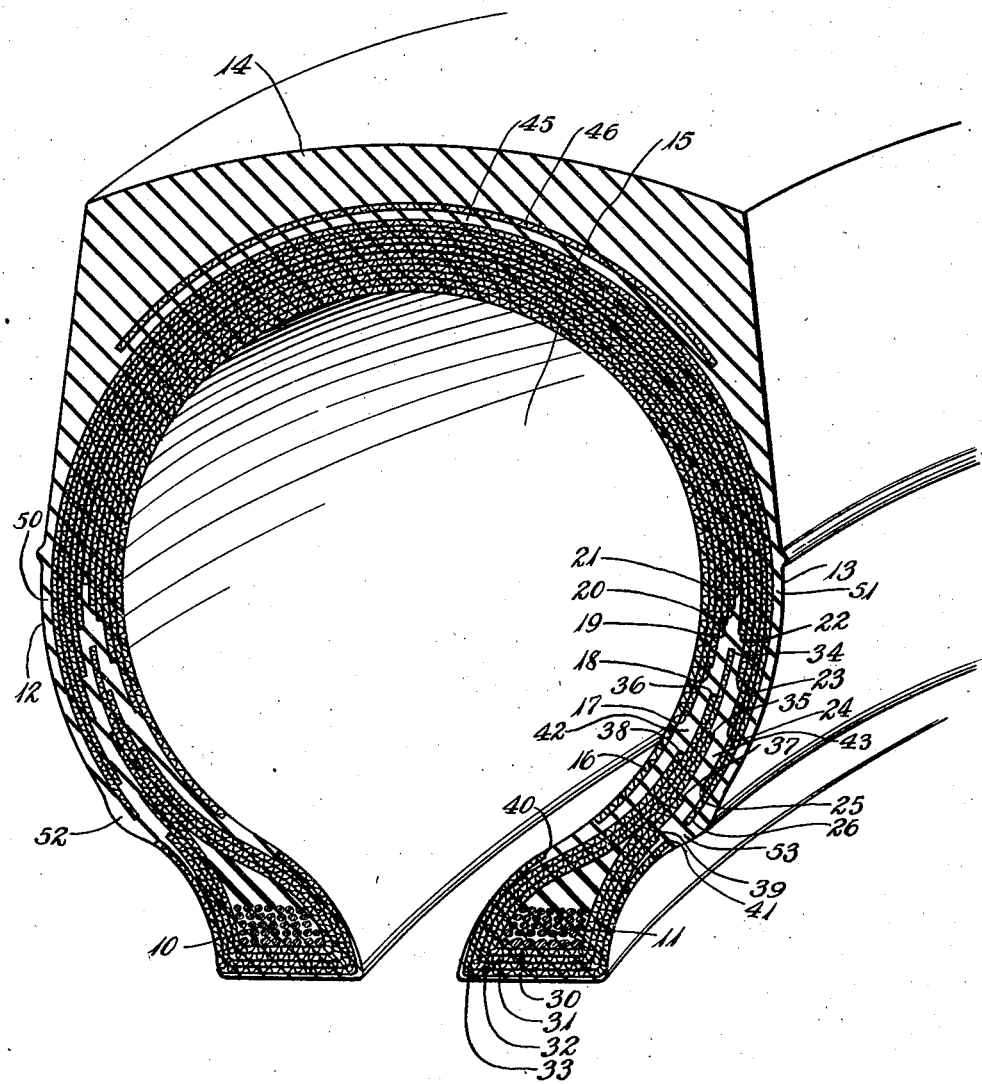
Inventor
Stanley M. Elliott
By Willis F. Avery
Atty.

Patented Nov. 11, 1947

2,430,560

UNITED STATES PATENT OFFICE 2,430,560

TIRE

Stanley M. Elliott, Akron, Ohio, assignor to The B. F. Goodrich Company, New York, N. Y., a corporation of New York Application December 30, 1942, Serial No. 470,558

4 Claims. (Cl. 152—354)

This invention relates to tires for vehicles and is especially useful in the manufacture of inflatable tires where high stretchability is of advantage.

In the operation of farm implements it has been proposed to fill pneumatic tires with water or other heavy and substantially non-compressible fluids to provide added weight and to change the ground-contacting characteristics of the tire while reducing bouncing of the vehicle. It has been found, however, that as constructed heretofore the pneumatic tire casing when so used lacks the desired elasticity due to the low extensibility of the walls of the casing and the non-compressibility of the inflating liquid.

It has also been observed that in the use of pneumatic tires inflated with air the low extensibility of the tire casing interferes with the complete utilization of the elasticity of the inflating medium.

The present invention aims to overcome the foregoing and other difficulties and to provide a tire casing of the desired increased resilience.

The principal objects of the invention are to provide greater elastic deformation of the tire, to provide a tire having stretchable areas, and to provide a change of inflation characteristics with changes in loading. It is a more specific object of the invention to provide the zones of increased stretchability in the sidewall portions of the casing adjacent the bead portions thereof, permitting the radially outer and ground contacting portions of the tire to be of reduced stretchability while the desired resilient action of the tire as a whole is obtained.

These and other objects will appear from the following description and the accompanying drawing.

Of the drawing, the figure is a cross-sectional view in perspective of a tire casing constructed in accordance with and embodying the invention.

In the illustrative embodiment of the invention, elastic stretchable areas are provided in the walls of a tire casing, preferably adjacent the bead portions thereof, by the provision of zones of elastic rubber-like material acting in shear.

Referring to the drawing, which shows one embodiment of the invention, the numerals 10, 11 designate inextensible bead cores of annular shape adapted to retain the tire casing on the wheel. Extending from the bead cores are sidewalls 12, 13, which connect the bead cores to an annular ground-engaging tread 14 of rubber or other rubber-like resilient material. The sidewalls and tread define, with the bead portions of the casing, an annular space 15 which may be filled by a gas or liquid under pressure and may accommodate an inner tube for holding the inflating fluid.

Extending about the space 15 from sidewall to sidewall are a succession of layers of reinforcing material such as cord or fabric and represented by the plies 16, 17, 18, 19, 20, 21, 22, 23, 24, 25, and 26. These plies are rubberized with rubber or other rubber-like material and extend short of the bead cores at each side of the tire. In the embodiment shown the plies from ply 16 outwardly to ply 21 are of progressively decreasing width and the plies from ply 21 outwardly to ply 26 are of progressively increasing width with their lateral margins stepped with relation to each other.

About each bead core are composite bodies of a plurality of reinforcing strips which have their margins extending into the sidewalls adjacent the margins of the plies 16 to 26 but spaced therefrom in the manner of tongues disposed in matched relation in the grooves of the margins above-mentioned. These side-reinforcing strips, referring to those enclosing the bead core 11, are designated by the numerals 30, 31, 32, and 33 are of rubberized cord or fabric. They are so arranged that their margins are stepped to provide the tongues for matching the grooves as shown in the drawing, a desirable arrangement being shown in the drawing where the margin 34 of the flipper strip 30 extends well up the sidewall and in substantial alignment with, but well spaced from, tread-reinforcing ply 21 and the other margin 35 is of less extent and well spaced from and in alignment with ply 22. Strip 31 has one margin 36 well spaced from and in alignment with ply 20 and its other margin 37 well spaced from and in alignment with ply 23. Strip 32 has its margins 38, 39 similarly spaced from plies 19 and 24 respectively and ply 33 has its margins 40, 41 similarly spaced from plies 16 and 26 respectively. A relatively thick layer 42 of cushioning rubber-like material of thickness greater than the thickness of the individual cord plies, as shown in the drawing is located between the margins of the inner plies 16 to 20 and the flipper strips and a similar layer 43 of similar material extends between the flipper strips and the margins of the outer plies 21 to 26. The arrangement is such that a body of cushioning rubber-like material entirely separates the grooved matching margin of the bodies of plies of reinforcing material in the tread and sidewall regions from the tongued matching margins of reinforcing material associated with the bead cores and is adapted to be stressed by shear action therebetween thereby providing elastic means in the sidewalls of the casing adapted to stretch and increase the area of the annular space 15 of the tire as a whole under pressure from within such space, while the radially outer regions of the tire are nevertheless capable of acting without extensive stretch in such regions.

A cushion 45 and a breaker strip 46 may be included in the tire beneath the tread 14 which may be formed with any desired cleat or non-skid design.

While a certain arrangement of the reinforcing plies and strips has been shown in which the strips extend between the margins of groups of carcass plies separated therefrom by the cushioning material under shear, it will be understood that all the margins of the strips may extend inside or outside of all the margins of the carcass plies or that other dispositions of the ply margins are feasible. It is advisable, however, to step off the plies so that no zone of sharp hinging is present.

In manufacturing the tire, the various plies of rubberized cord or fabric are assembled about a drum or other former in succession and adhered into contact with each other. The strips or flippers are assembled about the bead cores and then assembled with the other materials in regular order. The tire is then shaped, if necessary, and vulcanized.

The tire is of particular advantage where, as in use on agricultural implements, it is desired to fill the casing or an inner tube located therein with water or other noncompressible liquid, as the cushion layers of rubber-like material in the sidewalls of the tire are elastic and are able to extend under sudden increases of load providing a spring cushioning of the vehicle while changing the loading characteristics of the tire. The tire may also be used for other purposes, however, and inflated with air if desired, thereby providing superior cushioning of the vehicle.

The extension of the outer reinforcing plies of the tire toward the beads provides a good foundation for the outer sidewall coverings 50, 51 of rubber-like material, reinforcing it against cracking due to excessive stretch. Where these side coverings end, they may be merged with bodies 52, 53 of cushioning rubber extending above the last margin of the outermost carcass ply 26 to provide a transitional body of more stretchable material where the ply ends. The tread 14 and side covering portions 50, 51 may be made as continuations of each other.

Variations may be made without departing from the scope of the invention as it is defined by the following claims.

I claim:

1. A tire casing having a pair of inextensible bead portions and a tread portion united thereto by a pair of side walls, said casing comprising a composite annular body of reinforcing plies in said casing terminating in said side walls short of said bead portions, a pair of composite bodies of reinforcing plies extending from said bead portions into said side walls to positions opposed to but short of the first said composite body, the three composite bodies each having the margins of its plies arranged in stepped relation from its innermost and outermost plies toward an intermediate ply of the body, a margin of one body being stepped in a tapered manner to provide a tongue, and the margin of the opposing body being stepped in a manner to provide a groove for receiving said tongue in spaced-apart, overlapping relation, the tongue and groove margins being separated by resilient rubber-like material of a thickness greater than the thickness of the individual plies, and said rubber-like material uniting the opposed margins of said bodies and providing zones in the side walls of high extensibility as compared to remaining portions of the casing.

2. A tire casing having a pair of inextensible bead portions and a tread portion united thereto by a pair of side walls, said casing comprising a composite annular body of rubber-covered cord plies in said casing terminating in said side walls short of said bead portions, a pair of composite bodies of rubber-covered cord plies secured to said bead portions and extending into said side walls to positions opposed to but short of the first said composite body, the three composite bodies each having the margins of its plies arranged in stepped relation from its innermost and outermost plies toward an intermediate ply of the body, a margin of one body being stepped in a tapered manner to provide a tongue, and the margin of the opposing body being stepped in a manner to provide a groove for receiving said tongue in spaced-apart, overlapping relation, the tongue and groove margins being separated by resilient rubber-like material of a thickness greater than the thickness of the individual cord plies, and said rubber-like material uniting the opposed margins of said bodies and providing zones in the side walls of high extensibility as compared to remaining portions of the casing.

3. A tire casing having a pair of inextensible opposite bead portions and a tread portion united thereto by side walls, said casing comprising rubber-like material and three annular bodies of cords arranged in superimposed plies with successive plies of each body having their margins stepped from the innermost and outermost plies of the body toward intermediate plies thereof to provide tongue and groove matched annular margins of said bodies opposed to each other in matching, spaced-apart relation, two of said bodies being secured respectively to opposite bead portions of the tire, and the third body being located in the tread portion of the tire with its margins opposed to the margins of the first two said bodies in the side walls of the tire above said bead portions, and bodies of resilient rubber-like material separating and uniting said matched margins and providing the sole connections between said bodies.

4. A tire casing having a pair of inextensible opposite bead portions and a tread portion united thereto by side walls, said casing comprising rubber-like material and three annular bodies of rubberized cords arranged in superimposed plies with successive plies of each body having their margins stepped from the innermost and outermost plies of the body toward intermediate plies thereof to provide tongue and groove matched annular margins of said bodies opposed to each other in matching, spaced-apart relation, two of said bodies being secured respectively to opposite bead portions of the tire and having tongue margins thereof in the side wall of the tire, and the third body being located in the tread portion of the tire and having groove margins thereof opposed to the tongue margins of the first two said bodies in the side walls of the tire above said bead portions, and bodies of resilient rubber-like material separating and uniting said matched margins and providing the sole connections between said bodies.

STANLEY M. ELLIOTT.

REFERENCES CITED

The following references are of record in the file of this patent:

UNITED STATES PATENTS

| Number | Name | Date |
|---|---|---|
| 1,457,942 | Shively | June 5, 1923 |
| 1,818,944 | Darrow | Aug. 11, 1931 |
| 2,225,042 | Elliott | Dec. 17, 1940 |

FOREIGN PATENTS

| Number | Country | Date |
|---|---|---|
| 905 | Great Britain | 1913 |
| 24,030 | Great Britain | 1912 |
| 736,231 | France | 1932 |

Certificate of Correction

Patent No. 2,430,560.                                                                 November 11, 1947.

STANLEY M. ELLIOTT

It is hereby certified that error appears in the printed specification of the above numbered patent requiring correction as follows:

Column 2, line 17, after the word "other" and before the period insert *providing a composite annular body of rubber covered cord plies having circumferentially grooved or notched margins, as illustrated in the drawing*;

and that the said Letters Patent should be read with this correction therein that the same may conform to the record of the case in the Patent Office.

Signed and sealed this 29th day of March, A. D. 1949.

[SEAL]

THOMAS F. MURPHY,
*Assistant Commissioner of Patents.*